Aug. 30, 1955     P. C. DE PAGTER     2,716,580

ROLLER BEARING

Filed Oct. 3, 1951

INVENTOR.

Pierre C. de Pagter

BY   Jay C. Taylor

Attorney

United States Patent Office 2,716,580
Patented Aug. 30, 1955

2,716,580

ROLLER BEARING

Pierre C. de Pagter, Ann Arbor, Mich.

Application October 3, 1951, Serial No. 249,460

10 Claims. (Cl. 308—201)

The present invention relates to improvements in roller bearings, particular annular ball bearings.

In the construction of roller bearings, it has been conventional to provide coaxial inner and outer race rings having confronting raceways and a plurality of rollers, such as balls, cylinders, truncated conical members, or the like, riding in the raceways. A suitable retainer is usually provided to hold the rollers in circumferentially spaced relation. It has long been desirable to provide such a bearing construction which, after being initially greased, would prevent leakage of grease from the bearing, and which would also prevent dust and other particles from entering the bearing. Many structures have been proposed to this end, but prior to the present invention no completely satisfactory solution to the problem has been advanced, the structures being either inefficient in operation or too costly to manufacture.

An important object of the present invention is to provide a bearing structure of the foregoing nature which may be both simply and economically fabricated and assembled, yet which provides an efficient shield for retaining grease and holding out dirt.

Another object is to provide such a structure wherein the roller retainer also comprises the grease and dust shield, so as to reduce the cost of fabrication and assembly.

Still another object is to provide an improved grease and dust shield which may be readily employed with existing roller bearing structures with a minimum of modification of the latter.

A more specific object is to provide an annular channel-like grease shield adapted to fit snugly in the annular space between the inner and outer race rings, with the channel mouth opening toward the roller members. In this construction, the inner and outer channel walls of the shield fit closely against the adjacent outer crcumferential surface of the inner race ring and the inner circumferential surface of the outer race ring, respectively, to complete a grease seal therewith. Adjacent the channel base and radially overlapping closely the adjacent edges of the inner and outer rings are flange portions, which cooperate with the channel sidewalls to prevent leakage of grease and also to serve as dust shields to prevent entry of dirt particles. These latter flanges may comprise integral portions of the channel-like shield, or may comprise radial extensions of a separate annular shield member secured closely to the exterior of the channel base of the shield. Thus the assembled shield effectively closes the annular space at one axial side of the roller bearing. A similar shield is provided at the other side of the bearing.

Other important objects are to provide such a shield construction wherein the channel walls of the shield are provided with portions which project between the roller members to space the latter circumferentially and thus adapt the shield to serve also as a roller retainer, and to provide such a structure wherein the aforesaid portions also provide simple and improved means for locating and spacing the axially opposed grease shields in their proper relative assembled positions.

Other objects of this invention will appear in the following description and appended claims, reference being had to the accompanying drawings forming a part of this specification wherein like reference characters designate corresponding parts in the several views.

Figure 2:
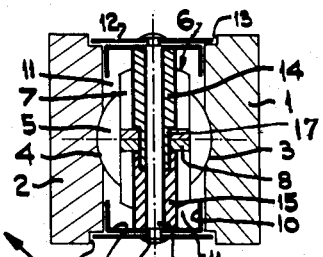
Fig. 2 is a vertical radial section taken in the direction of the arrows substantially along the line B—B of Fig. 1.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a particular embodiment of the present invention is illustrated by way of example with an annular roller bearing having spherical roller elements, although it will be apparent from the following that the present invention is readily adaptable for use with other suitable roller elements, such as cylindrical or conical elements or the like. The structure shown comprises outer and inner coaxial race rings 1 and 2 having corresponding confronting raceways 3 and 4 for the plurality of balls 5 which ride along the raceways. A two-part ball retainer element indicated generally by the numeral 6 is provided to maintain the balls 5 in circumferentially spaced relation and comprises a pair of similar mating ring retainers, each formed with a plurality of spherically dished portions 7 conforming closely to the contour of the balls in bearing relation. The dished portions 7 of the two ring retainers are arranged in cooperating pairs to retain the balls 5 therebetween. Intermediate the dished portions 7, mating flat portions 8 of the two ring retainers abut each other substantially along the plane through the line of centers of the balls 5.

The structure described to this point is conventional, the flat portions 8 of the ring retainers being riveted firmly together in the usual instance. In accordance with the present invention, however, a pair of similar mating channel-like grease seals or shields are provided, one for each axial side of the bearing. Each grease shield comprises an annular channel base 9 spacing the outer and inner race rings 1 and 2 and having integral outer and inner channel sides 10 extending toward the balls 5 in juxtaposition respectively with the inner circumferential surface of the outer ring 1 and with the outer circumferential surface of the inner ring 2, as indicated in Fig. 2. The channel sides 10 are closely fitted between the rings 1 and 2 in bearing relation, so that grease is prevented from leaking from the grease area 11. Nevertheless, the paired grease retainers 9, 10 are rotatable independently of both rings 1 and 2. The spacing between the channel walls 10 and adjacent rings 1 and 2 is highly magnified in Fig. 2 for the sake of illustrating the separate parts.

Closely overlying each channel base 9 is an annular dust shield 12 which radially overlaps adjacent portions of the rings 1 and 2 closely and, in the present instance, is recessed in annular rabbets 13 formed in the adjacent edge portions of the rings 1 and 2. The spacing illustrated in Fig. 2 between the dust shield 12 and adjacent overlapped portions of the rings 1 and 2 is also magnified for the purpose of illustration. Actually the members 9 and 12 are closely abutting and may be formed integrally with each other if desired, or secured together by welding for example.

In the present instance, the ball retainer 6, shields 9, 10, and dust shields 12 are maintained in assembled relation by a plurality of pairs of telescoping tubular spacers 14 and 15 tied together by pins or rivets 16. Each spacer 14 is provided with a reduced extension 17 which projects through aligned apertures in one of each of the pairs of abutting flat portions 8 of the ring retainer 6 and into an enlarged bore portion of the mating tubular spacer 15. The latter is disposed in end-abutting relation between the adjacent flat portion 8 and confronting channel base 9 of the grease shield so as to maintain these members in proper spaced relation. The other flat 8 and base 9 of the opposed grease shield are similarly maintained in properly spaced relation by the shoulder at the base of the reduced extension 17 and the opposite end of the tubular spacer 14, the assembly being secured together by the pin or rivet 16 having its extremities flared at 18 against the adjacent axially outer surfaces of the dust shields 12.

The resultant assembly comprising the balls 5, retainer rings 6, grease shields 9, 10, and dust shields 12 are rotatable as a unit independently of either the outer ring 1 or inner ring 2. The shields 12 serve as primary barriers to dust and dirt particles which would otherwise enter the bearing. The shields 9, 10 similarly serve as primary barriers to prevent the leakage of grease from the bearing. However both shields comprise cooperating extensions of each other. The shield elements may be economically formed to precision measurements by stamping operations and are readily assembled in the manner disclosed to complete a superior and efficient annular roller bearing.

Figure 4:
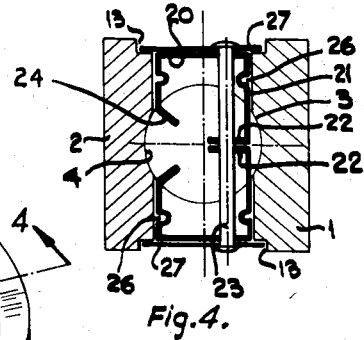
Fig. 4 is a vertical radial section taken in the direction of the arrows substantially along the line D—D of Fig. 3.
Figure 3:
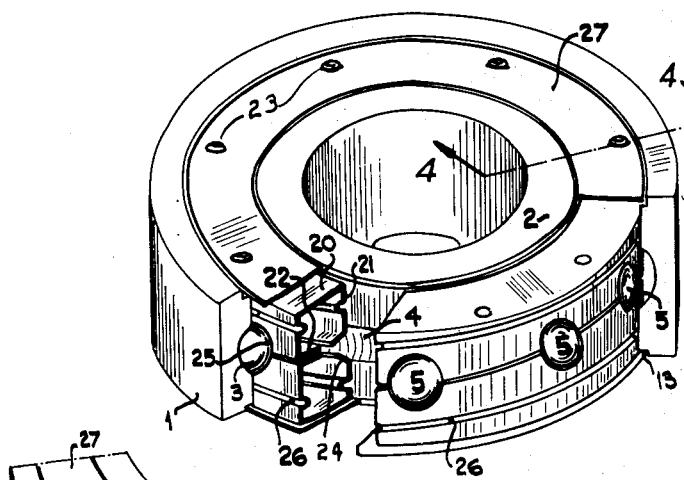
Fig. 3 is a fragmentary perspective view of another embodiment of a roller bearing constructed in accordance with the present invention, portions being broken away to show details of construction.
Figure 5:
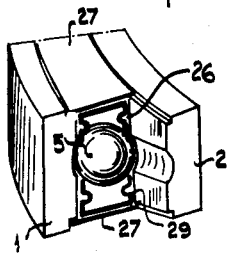
Fig. 5 is a fragmentary perspective view of the bearing shown in Fig. 3, illustrating the mounting of the roller member within its retainer.

Construction of each retainer ring 6 involves a complex series of forming operations, starting with a flat annular ring of oversize diameter. This ring is shrunk in diameter to the desired final dimensions upon formation of the spherical ball-retaining portions 7. In order to simplify the formation of the ball retainer and thereby reduce the cost of the resulting bearing, a modification of the present invention is illustrated in Figs. 3, 4, and 5, wherein the grease shields also comprise the ball retainer. In this construction, the outer and inner race rings 1 and 2 with their confronting raceways 3 and 4 and balls 5 are the same as above described. An annular channel-like grease shield generally similar to the shield 9, 10 in operation is provided for each axial side of the bearing. Referring particularly to Fig. 4, each grease shield comprises an annular channel base 20, spacing the rings 1 and 2, and integral inner and outer channel side portions 21 closely juxtaposed with the inner circumferential surface of the outer ring 1 and outer circumferential surface of the inner ring 2, in the manner of the aforementioned channel side portions 10.

Figure 1:
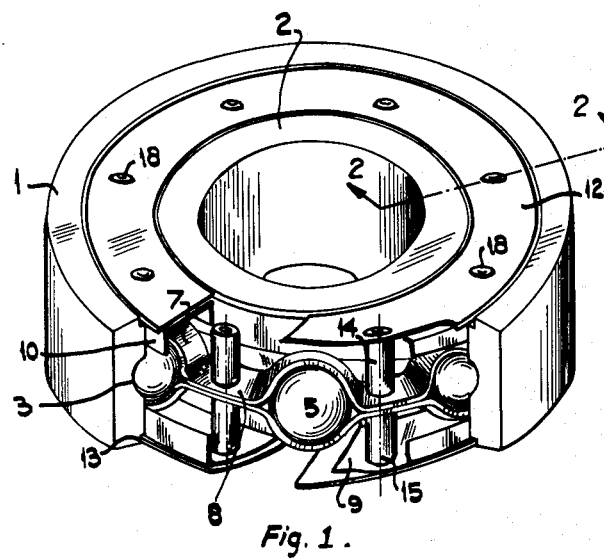
Fig. 1 is a fragmentary perspective view of a roller bearing constructed in accordance with one embodiment of the present invention, portions being broken away to show details of construction.

Portions of the outer channel sidewalls 21 of the opposed grease shields intermediate the balls 5 extend toward each other substantially to the plane through the centers of the balls, then bend sharply inward at right angles as flanges 22 abutting each other in mutually supporting relation. The inbent flanges 22 are preferably as short as possible so as to assure optimum rigidity, yet to provide adequate supporting area for a pin or rivet 23 as discussed below. As indicated in Fig. 4, the pin 23 extending axially between each pair of adjacent balls 5 will be offset radially outward from the line of centers through said balls. This construction is particularly desirable because, as may be observed by comparison with Fig. 1, the supporting area provided by each flange 22 for the pin 23 increases radially outward by virtue of the proportional increase of the circumferential arc between balls as the radius increases. Thus use of a pin 23 of maximum diameter is permitted.

Similarly, portions of the inner channel flanges 21 of the opposed grease shields intermediate the balls 5 terminate in flange portions 24 which converge toward each other radially outward and generally toward the line of centers through the balls 5. The flanges 22 and 24 add rigidity to the inner and outer channel side flanges 21. In addition, as indicated in Fig. 3, the portions of the inner and outer channel sidewalls 21 of each grease retainer intermediate the balls 5 are shaped at 25 to conform closely to the balls 5 in bearing relation, permitting the balls to extend through the side flanges 21 into the opposed raceways 3 and 4 and supporting the balls circumferentially with a minimum of frictional resistance.

Additional stiffening of the side flanges 21 is achieved by one or more annular air pockets 26. The latter comprise small circumferentially extending channels or grooves embossed in the flanges 21 and opening toward the adjacent circumferential wall of the corresponding ring 1 or 2, so as to collect grease tending to leak from the bearing and also to collect dust which might otherwise enter the bearing. By virtue of the construction shown, the air pockets 26 are readily formed in the comparatively thin channel flanges 21, avoiding the more difficult operation of machining such grooves in the race rings as heretofore. Similar traps of air pockets will be provided as desired in the side flanges of the grease shields illustrated in Figs. 1 and 2, or of the grease shields to be discussed below in connection with Fig. 6.

In order to provide more positive means to prevent entry of dust into the bearing, an annular dust shield 27 comparable to the shield 12 is provided adjacent the axially outer surface of each channel base 20 so as to fit closely within the aforesaid rabbets 13 and overlap adjacent edge portions of the rings 1 and 2. The shields 20, 21 and dust shield 27 are maintained in assembled relation by means of the aforesaid pin or rivet 23 extending axially through the shields and the abutting flange portions 22, each end of the pin 23 being flanged closely against the adjacent shield 27. By this structure, the desired spacing between the opposed grease shields is maintained by the abutting flanges 22, permitting elimination of the tubular spacers 14 and 15 required in Fig. 2.

Figure 6:
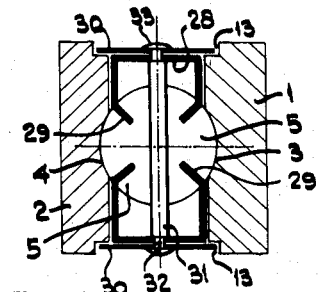
Fig. 6 is a radial section similar to Fig. 4, showing still another modification of the present invention.

Fig. 6 illustrates still another embodiment of the present invention wherein the bearing comprises outer and inner race rings 1 and 2 having the raceways 3 and 4 and balls 5 as illustrated in Figs. 1 through 4. An opposed pair of channel-like grease shields indicated generally by the numeral 28 are employed in the manner discussed above. In Fig. 6 however instead of providing abutting flange portions 22 as illustrated in Fig. 4, the portions of both side flanges of each grease shield intermediate the balls 5 terminate in converging flange portions 29 directed generally toward the line of centers of the balls. The flange portions 29 provide the necessary stiffening for the channel side flanges of the grease shields. The portions of the channel side walls and flanges 29 adjacent the balls 5 conform closely to the latter in bearing relation so as to support the same in circumferentially spaced relation with a minimum of frictional resistance.

An annular dust shield 30 similar to the dust shields 12 and 27 is disposed adjacent the channel base of each grease shield 28 and within the rabbets 13. The assembled shields 28 and 30 are maintained in assembled relation by a plurality of spacer pins or rivets 31 extending axially at locations intermediate the balls 5. Each pin 31 is provided with a reduced neck portion 32 adjacent each end which extends through the corresponding channel base of the shield 28 and the dust shield 30, the ends 33 of each pin being flared against the adjacent outer surface of the dust shield 30. The shoulders formed at the base of the neck portions 32 maintain the grease shields 28 in proper spaced relation.

I claim:

1. In an annular ball bearing having coaxial inner and outer rings with confronting raceways and a plurality of balls riding along said raceways, shield means comprising paired annular shields spacing said inner and outer rings and spaced by said balls, each annular shield having inner and outer flanges closely juxtaposed respectively with the inner circumferential surface of the outer ring and outer circumferential surface of the inner ring, circumferentially spaced portions of said flanges being recessed and fitting closely around said balls in bearing relation, thereby holding said balls in circumferentially spaced relation, a flange of each shield having ledge portions intermediate said balls and abutting the corresponding ledge portions of the other shield, and means connecting said abutting edge portions to hold said paired shields in assembled relation.

2. In an annular roller bearing having coaxial inner and outer rings with confronting raceways and a plurality of rollers riding along said raceways, shield means comprising paired annular shields spacing said inner and outer rings and spaced by said rollers, each annular shield having inner and outer flanges closely juxtaposed respectively with the inner circumferential surface of the outer ring and outer circumferential surface of the inner ring, said flanges having portions spacing said rollers circumferentially and extending into the space between said rings and means connecting said portions to hold said paired annular shields in assembled relation.

3. In an annular ball bearing having coaxial inner and outer rings with confronting raceways and a plurality of balls riding along said raceways, shield means comprising paired annular shields spacing said inner and outer rings and spaced by said balls, each shield having annular inner and outer flanges extending toward the other shield and closely juxtaposed respectively with the inner circumferential surface of the outer ring and outer circumferential surface of the inner ring, a flange of each shield having ledge portions extending toward the other flange of the same shield and abutting the corresponding ledge portions of the other shield, the ledge portions spacing the balls circumferentially, and means piercing said abutting portions and securing said paired shields together.

4. In an annular ball bearing having coaxial inner and and outer rings with confronting raceways and a plurality of balls riding along said raceways, shield means comprising paired annular shields spacing said inner and outer rings and spaced by said balls, each shield having annular inner and outer flanges extending toward the other shield and closely juxtaposed respectively with the inner circumferential surface of the outer ring and outer circumferential surface of the inner ring, at least one flange of a shield having portions extending toward the other flange of the same shield and spacing said balls circumferentially, and means intermediate said balls holding said paired shields together in assembled relation.

5. In an annular ball bearing having coaxial inner and outer rings with confronting raceways and a plurality of balls riding along said raceways, shield means comprising paired annular shields spacing said inner and outer rings and spaced by said balls, each annular shield having radial portions closely overlapping adjacent portions of said inner and outer rings and also having inner and outer flanges closely juxtaposed respectively with the inner circumferential surface of the outer ring and outer circumferential surface of the inner ring, said flanges having portions spacing said balls circumferentially, and means piercing said portions and securing said paired annular shields in assembled relation.

6. In an annular ball bearing having coaxial inner and outer rings with confronting raceways and a plurality of balls riding along said raceways, paired annular shields spacing said inner and outer rings and spaced by said balls, each shield having inner and outer flanges closely juxtaposed respectively with the inner circumferential surface of the outer ring and outer circumferential surface of the inner ring, said outer flanges having inwardly directed portions located radially outward of the annular line of centers of said balls and spacing said balls circumferentially, and means securing said portions together and holding said shields in assembled relation.

7. In an annular ball bearing having coaxial inner and outer rings with confronting raceways and a plurality of balls riding along said raceways, paired annular shields spacing said inner and outer rings and spaced by said balls, each shield having inner and outer flanges closely juxtaposed respectively with the inner circumferential surface of the outer ring and outer circumferential surface of the inner ring, a flange of each shield having ledge portions extending toward the other flange of the same shield and abutting corresponding ledge portions of the other shield and also spacing said balls circumferentially, a second pair of annular shields spaced axially by said first pair and closely juxtaposed therewith and also radially overlapping adjacent portions of the inner and outer rings in closely fitting relation, and means piercing said abutting ledge portions axially and holding said shields in assembled relation.

8. In an annular roller bearing having coaxial inner and outer rings spaced radially by a plurality of roller members riding along raceways at the confronting circumferential surfaces of said rings, an annular grease shield closing the annular space between said rings at an axial side of the bearing and having annular inner and outer flange portions directed axially toward said roller members and being closely juxtaposed respectively with the inner circumferential surface of the outer ring and with the outer circumferential surface of the inner ring, and an annular grease trap extending circumferentially in each flange comprising a channel therein and opening toward the adjacent circumferential ring surface and having its base offset toward the other flange.

9. In an annular roller bearing having coaxial inner and outer rings spaced radially by a plurality of roller members riding along raceways at the confronting circumferential surfaces of said rings, a pair of annular members at the opposed axial sides of the bearing respectively and each member having inner and outer annular flanges juxtaposed sufficiently closely respectively with the inner circumferential surface of the outer ring and with the outer circumferential surface of the inner ring to block passage of grease between said flanges and juxtaposed ring surfaces, each flange extending unbrokenly around the circumference of the juxtaposed ring surface and each annular member extending between its flanges to completely close the annular space therebetween, at least one flange of an annular member having portions extending toward the other flange of the same member and spacing said roller members circumferentially.

10. In an annular roller bearing having coaxial inner and outer rings spaced radially by a plurality of roller members riding along raceways at the confronting circumferential surfaces of said rings, a pair of annular members at the opposed axial sides of the bearing respectively and each member having inner and outer annular flanges juxtaposed sufficiently closely respectively with the inner circumferential surface of the outer ring and with the outer circumferential surface of the inner ring to block passage of grease between said flanges and juxtaposed ring surfaces, each flange extending unbrokenly around the circumference of the juxtaposed ring surface and each annular member extending between its flanges to completely close the annular space therebetween, a flange of each annular member having portions extending toward the other flange of the same member and spacing said roller members circumferentially, and means connecting said portions to hold said annular members in assembled relation.

References Cited in the file of this patent

UNITED STATES PATENTS

| | | |
|---|---|---|
| 980,101 | Hess | Dec. 27, 1910 |
| 1,115,124 | Starin | Oct. 27, 1914 |
| 2,295,771 | Batesole | Sept. 15, 1942 |
| 2,557,476 | Schwitter | June 19, 1951 |

FOREIGN PATENTS

| | | |
|---|---|---|
| 25,276 | Great Britain | 1908 |
| 407,450 | Great Britain | Mar. 22, 1934 |
| 45,460 | Sweden | Feb. 17, 1916 |
| 82,364 | Switzerland | Sept. 16, 1919 |
| 195,562 | Germany | Feb. 21, 1908 |
| 888,277 | France | Dec. 8, 1943 |